Aug. 6, 1940.  E. JOHNSON  2,210,486
BERRY CLEANER AND SEPARATOR
Filed Oct. 23, 1936  4 Sheets-Sheet 4
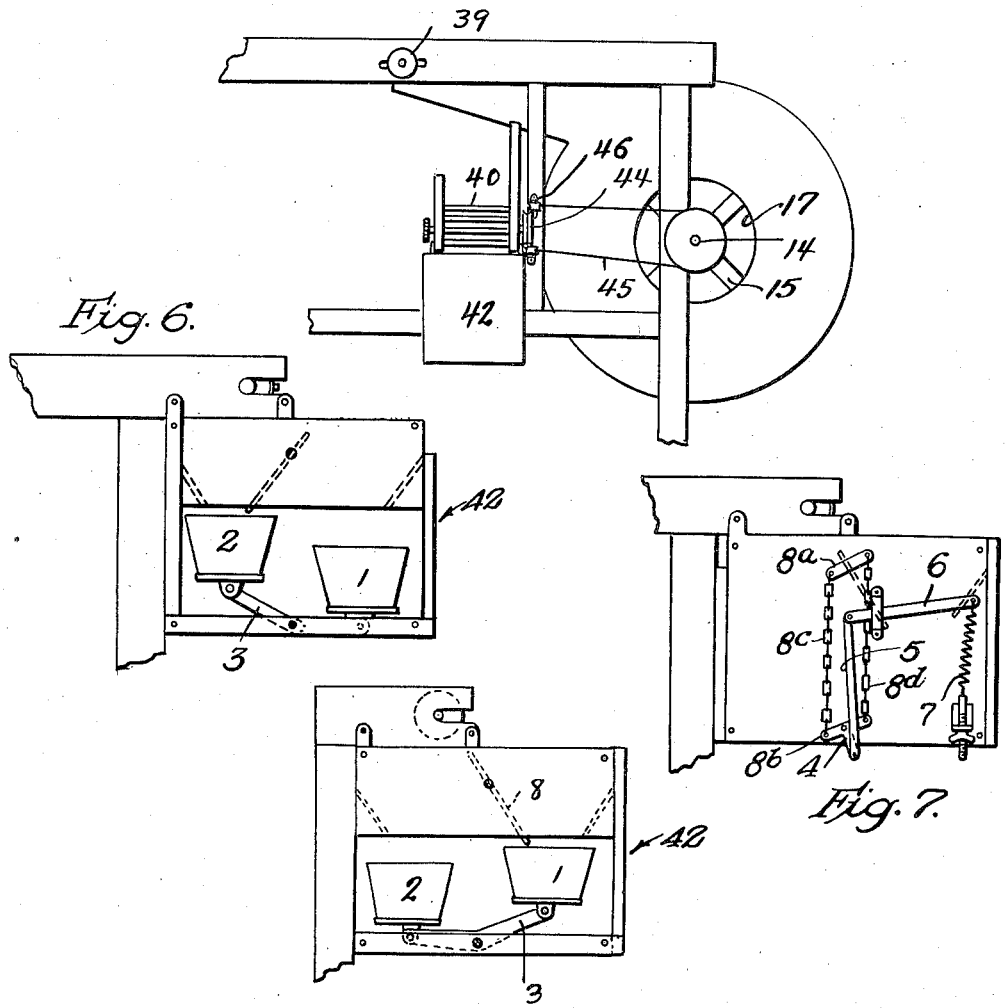
Inventor
Ezekiel Johnson
Attorneys Patented Aug. 6, 1940

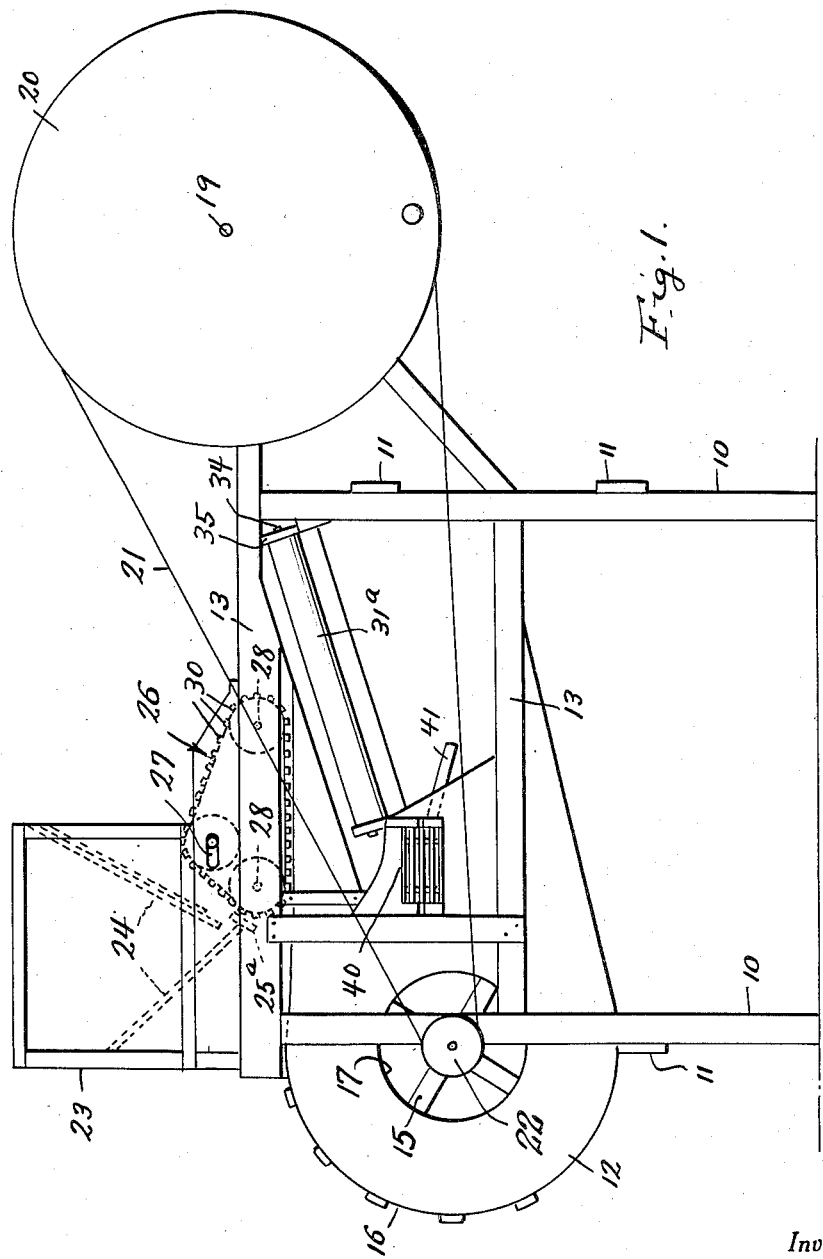

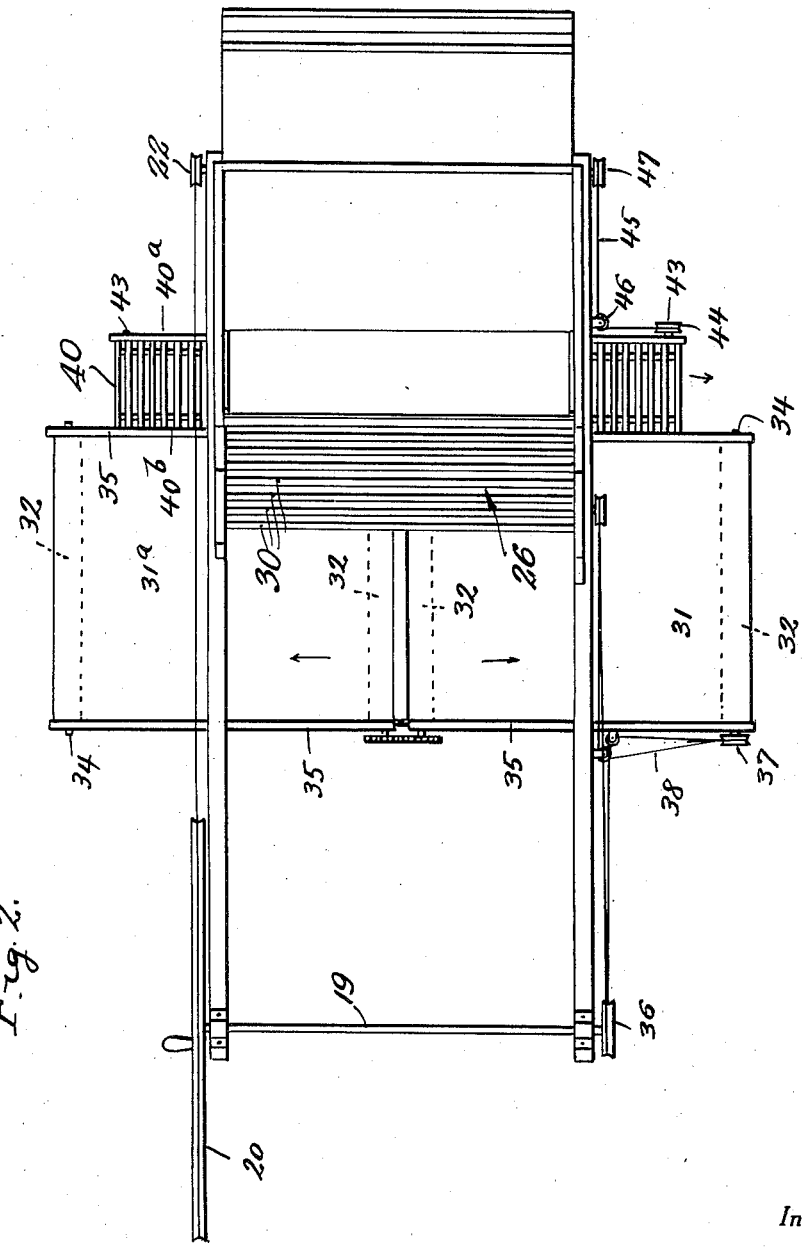

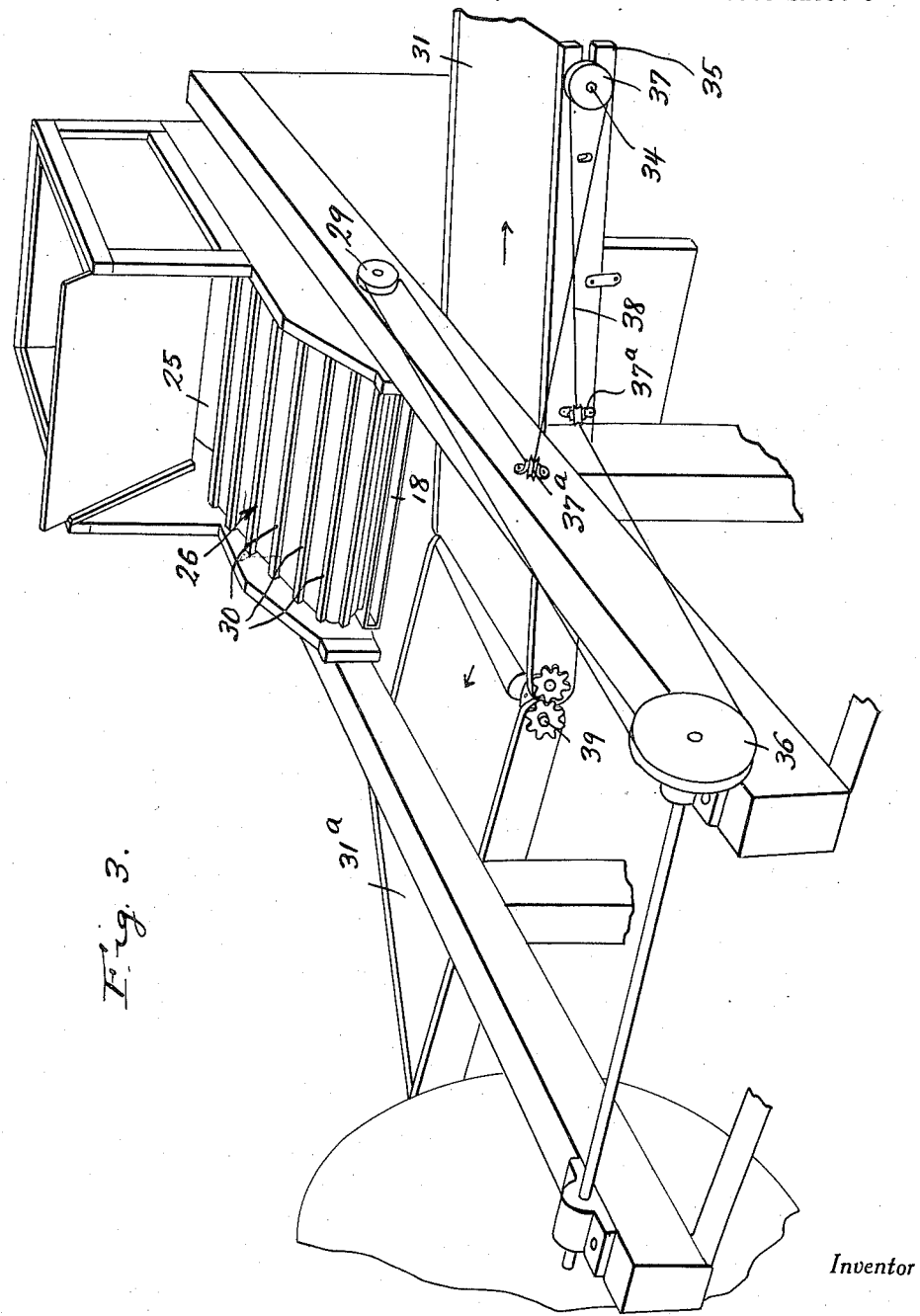

2,210,486

UNITED STATES PATENT OFFICE 2,210,486

BERRY CLEANER AND SEPARATOR

Ezekiel Johnson, Machias, Maine

Application October 23, 1936, Serial No. 107,268

1 Claim. (Cl. 209—12)

This invention relates generally to improvements in cleaning and separating machines, and particularly to machines adapted to separating chaff, leaves and other extraneous matter from dried peas, beans and other like commodities capable of rolling or gravitating down an incline, but especially berries, and an important object of the invention is to provide a machine which acts to separate or remove therefrom heavier objects such as branches, sticks, and small stones, which are not removed by the air blast of machines of this character now in use.

Another important object of the invention is to provide a machine of the character indicated which will separate small green and other undesirable fruit or berries from the large, ripe fruit.

Another important object of the invention is to provide apparatus of the character indicated which will automatically fill containers with a predetermined quantity of fruit.

Other important objects of the present invention will be apparent from a reading of the following description in connection with the drawings, wherein for purposes of illustration I have shown a preferred embodiment of the present invention.

In the drawings:

Figure 1 is a side elevational view of the left or drive side of the embodiment.

Figure 2 is a top plan view thereof showing the arrangement of the separator belts.

Figure 3 is a front perspective view thereof showing the belt system and feeder.

Figure 4 is an elevational view of the right hand side of the embodiment showing the automatic filler.

Figure 5 is a front elevational view of the filler.

Figure 6 is a view taken at right angles to Figure 5.

Figure 7 is an elevational view of the back of Figure 5.

Referring in detail to the drawings, and particularly to Figure 1, the machine includes corner standards or legs 10 which are connected by transverse bars 11 and which support panels 12 and longitudinal bars or supports 13. On a shaft 14 is mounted a fan 15 while a casing 16 encloses the fan. The side panels are provided with an opening 17 for the admission of air and is provided with an exit opening 18 shown in Figure 3.

At the opposite end of the machine is a shaft 19 carrying a drive wheel 20 connectible to a suitable source of power (not shown) and furnishing power to the fan through a transmission belt 21 and pulley 22.

A hopper or feeder 23 formed by four panels 24 Figure 1 is mounted atop the machine so that the berries and the like gravitating down the sides and inclines are discharged through the opening 25 on to an adjustable baffle plate or baffle board 25a whereby a constant level of the berries is provided for. The adjustment of this plate or board will determine the passing of a fixed stream or quantity of berries over the board to a feeding belt 26 mounted on three rolls 27 carried by shafts 28 driven by pulley 29 belted to pulley 36 mounted on shaft 19. The belt 38 starting at the lower side of pulley 36 runs through the lower angle or corner pulley to the top and down around pulley 37 to and through the upper angle or corner pulley to the bottom and up around pulley 29 then to the top and down around pulley 36 to the starting point.

The spaces formed by the union of the small elevating strips 30 to this feeding belt will carry only a predetermined quantity of berries affording a uniform supply down by the fan blast opening 18, where all of chaff and light waste is removed. This passage for air from the fan is so constructed that the current of air that is afforded is carried upwardly and outwardly at such an elevation that it is kept above the conveyor or separating belts 31 and 31a so that it will not in any manner impede the progress of fruit or berries in rolling or gravitating down the inclined surface of the separating belts.

The berries or the like then drop to the conveyor or separator belts 31 and 31a where small sticks, branches and clusters which do not roll are carried outwardly and upwardly by the conveyor belts. These conveyor belts 31 and 31a, Figures 2 and 3, form a cleaning or separating apparatus downwardly, inwardly and backwardly inclined across their surfaces toward a grading belt 40 and they are also upwardly and outwardly inclined lengthwise of their surfaces so that the force of gravity will give to the rolling objects an impulse to gravitate or roll inwardly and downwardly toward the grader 40. The sticks, branches or clusters being unable to roll are carried upwardly and outwardly by the movement of the conveyor belts thereby producing a complete separation thereof.

The belts 31 and 31a are carried by four rolls 32 which are supported on shafts 34 mounted in frames 35 and these shafts are driven by pulleys 36, 37, 37a connected by cross belts 38 which, with the gears 39 produce an outward operation of both belts.

Upon leaving the separating belts 31 and 31a the berries or other objects are collected and graded by the slatted grading belt 40 which runs crosswise of the machine in a direction as shown by arrows in Figure 2. The small green or undersized objects fall through the spaces 40a defined by slats 40b, to the chute 41 but the large, full, ripe fruit is carried along by the grader to the automatic container filler 42.

The grading belt 40 is operated over two rolls each having a shaft 43 driven by a pulley 44 and belt 45 passing over angle pulleys 46 around pulley 47 secured to the fan shaft 14.

The full ripe berries or fruit of a predetermined size from which the small, green and undesirable have been graded are then carried and deposited into the automatic container filler 42 at the top at A.

The two containers 1 and 2 rest upon a tilting or self leveling table attached to an arm 3 cut at an angle, and directly and securely attached to a shaft with a crank 4.

When the container 1 is up to a filling position it is held in place by the pull of the adjusting spring 7 through a leverage bar 6 and connecting rod 5 to the crank that is off center in the direction of the filling container.

The blade 8 is held in the position for filling container 1 by the rod or chains 8d and 8c attached to a bar 8b secured to the crank shaft 4 at right angles thereto and to the bar 8a secured to a shaft which forms the lower edge of blade 8.

When container 1 is filled to a weight determined by the position of the nut attached to adjusting spring 7 the container subsides by gravity and this automatically elevates container 2 by action of the angled lever arm 3 which is held in its position by the reverse action of the crank thrown off center in direction of container 2 and pull of adjusting spring 7.

By the reverse action of the crank and the two securely attached bars 8a and 8b by the connecting rod or chains 8c and 8d, the blade 8 is caused to reverse its position and close the outlet to the container 1 and furnish an outlet into container 2.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claim.

What is claimed is:

A berry cleaner and separator comprising a hopper for receiving the berries to be cleaned and separated, a conveyor onto which the hopper discharges, discharge means on said hopper acting to restrict the amount of berries discharged and distribute the discharged berries evenly across said conveyor, said conveyor having a portion thereof arranged in a declining plane, a pair of transversely and laterally and oppositely outwardly moving endless belts under the depressed end of the declining portion of the conveyor to receive berries gravitationally from the conveyor, said endless belts having a declination opposite to that of the declining portion of the conveyor whereby berries falling on said endless belts roll gravitationally down across said endless belts while the debris among the berries remains on and is carried laterally outwardly by said endless belts, a slotted grading belt below and running parallel to the depressed side of said endless belts and upon which the berries fall from said endless belts, a blower nozzle located in the space between said conveyor and said pair of endless belts, said nozzle being arranged to blow air across said pair of endless belt so as to separate the debris from the berries as the debris and berries fall from the declining portion of said conveyor toward onto endless belts while avoiding subjecting the berries and debris already on said endless belts to blower air.

EZEKIEL JOHNSON.